Figure 10:
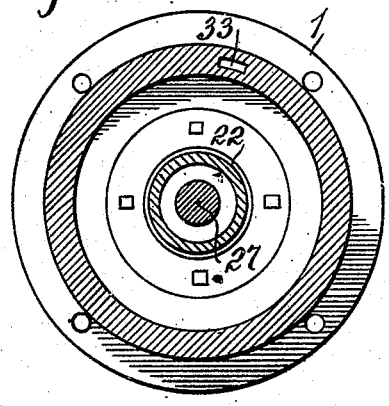

No. 854,857. PATENTED MAY 28, 1907.
T. H. VAN DYKE.
AIR BRAKE.
APPLICATION FILED JULY 12, 1906.
5 SHEETS—SHEET 1.
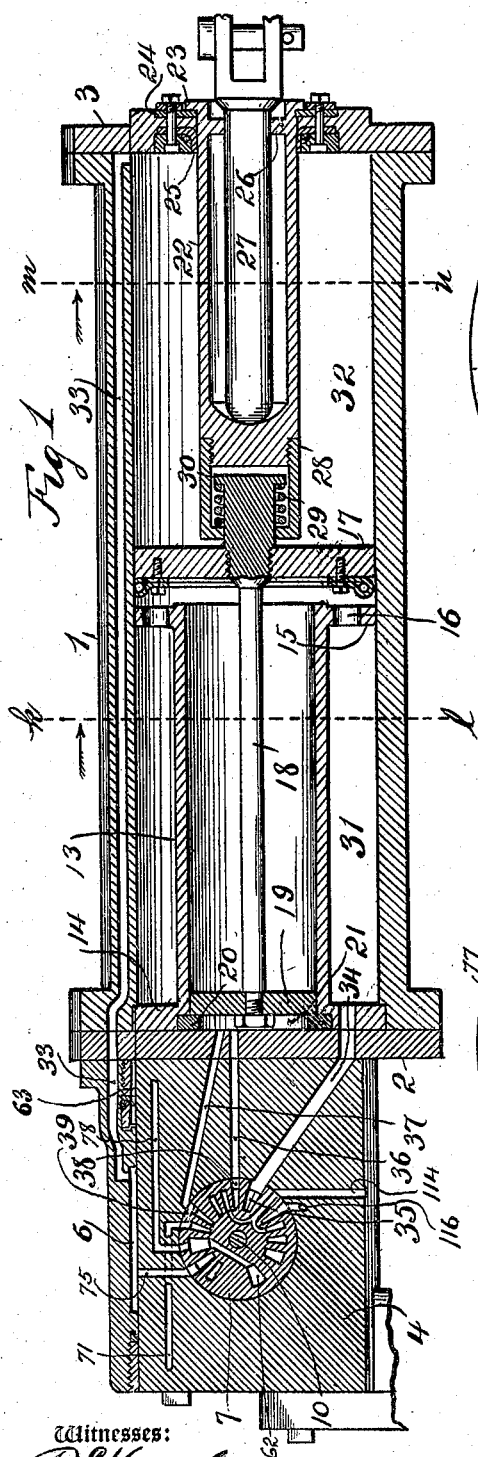
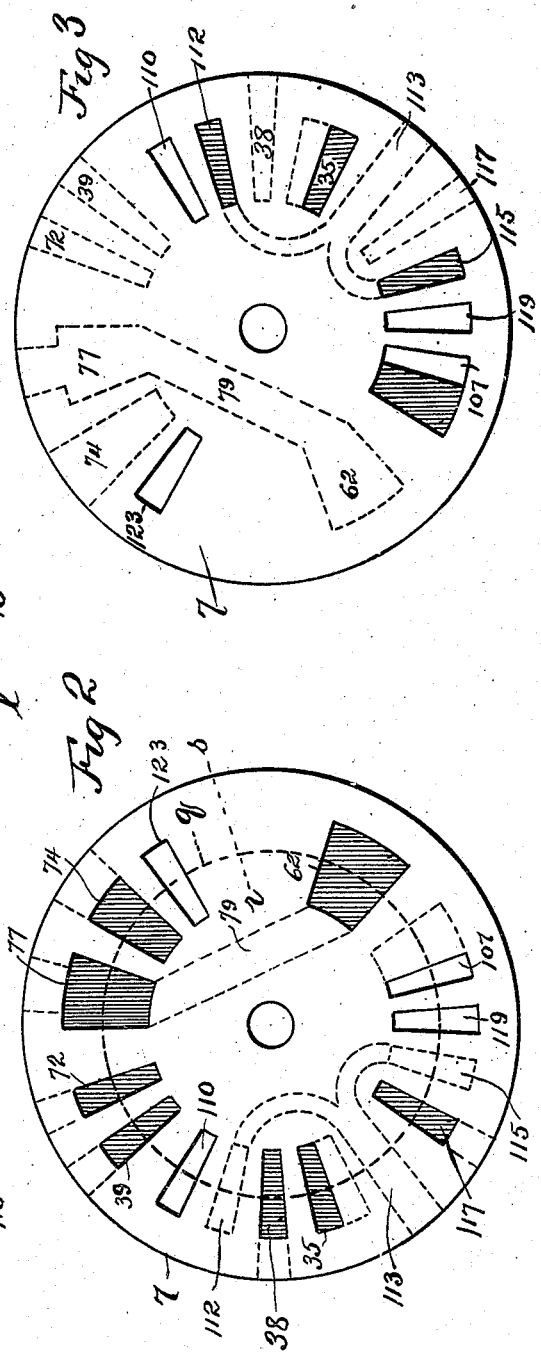
Thomas H. Van Dyke Inventor
By His Attorney Warren D. House
Witnesses:
R. E. Hamilton
E. B. House No. 854,857. PATENTED MAY 28, 1907.
T. H. VAN DYKE.
AIR BRAKE.
APPLICATION FILED JULY 12, 1906.
5 SHEETS—SHEET 2.
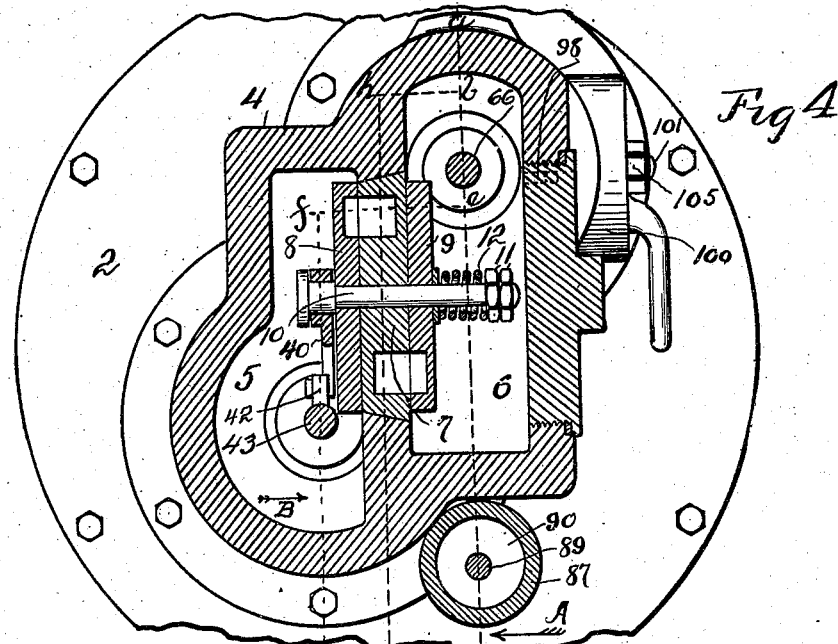
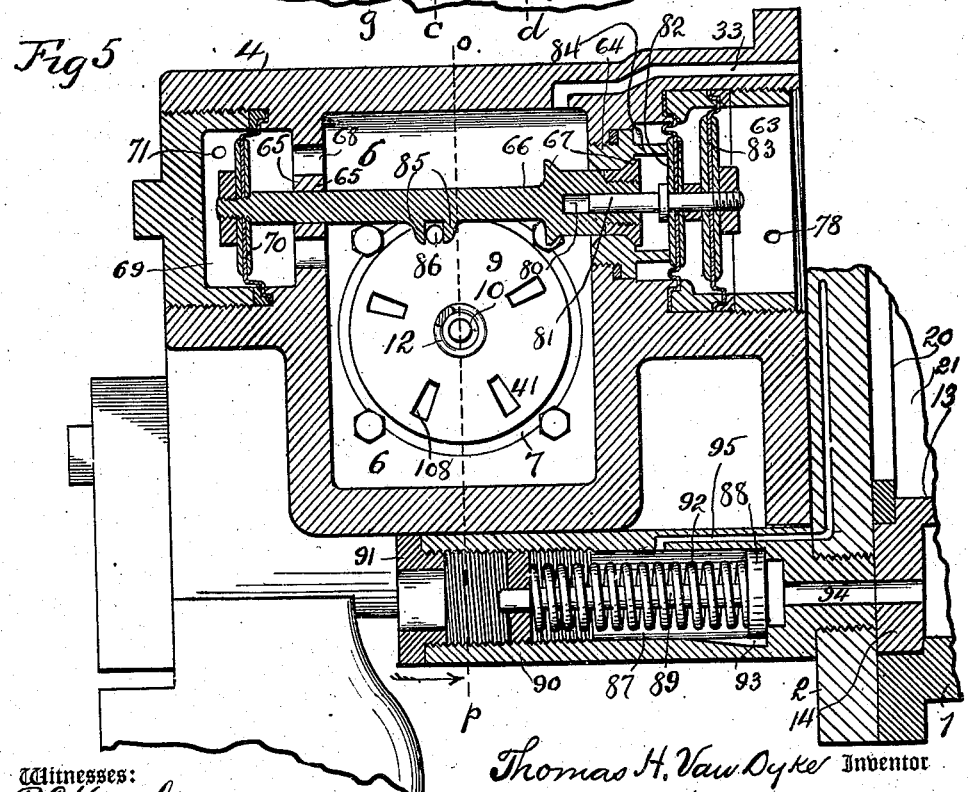
Witnesses:
R. E. Hamilton
E. B. House
Thomas H. Van Dyke Inventor
By His Attorney Warren D. House No. 854,857. PATENTED MAY 28, 1907.
T. H. VAN DYKE.
AIR BRAKE.
APPLICATION FILED JULY 12, 1906.
5 SHEETS—SHEET 3.
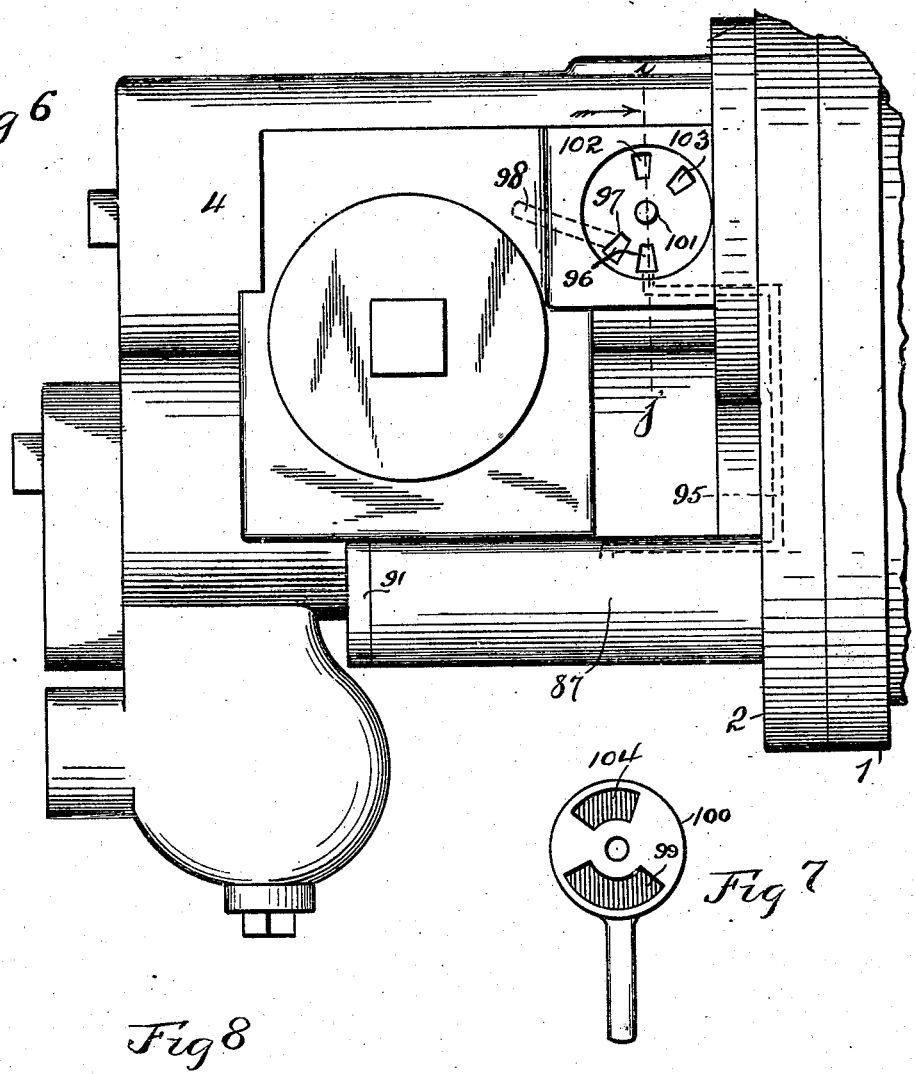
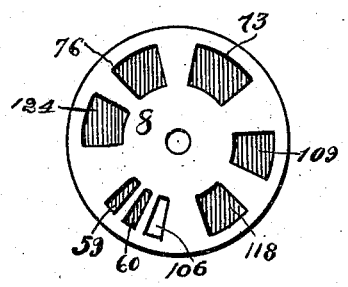
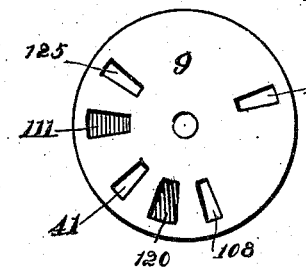

No. 854,857. PATENTED MAY 28, 1907.
T. H. VAN DYKE.
AIR BRAKE.
APPLICATION FILED JULY 12, 1906.

5 SHEETS—SHEET 4.

Witnesses:
R. E. Hamilton
E. B. House

Thomas H. Van Dyke Inventor
By His Attorney Warren D. House

No. 854,857. PATENTED MAY 28, 1907.
T. H. VAN DYKE.
AIR BRAKE.
APPLICATION FILED JULY 12, 1906.
5 SHEETS—SHEET 5.
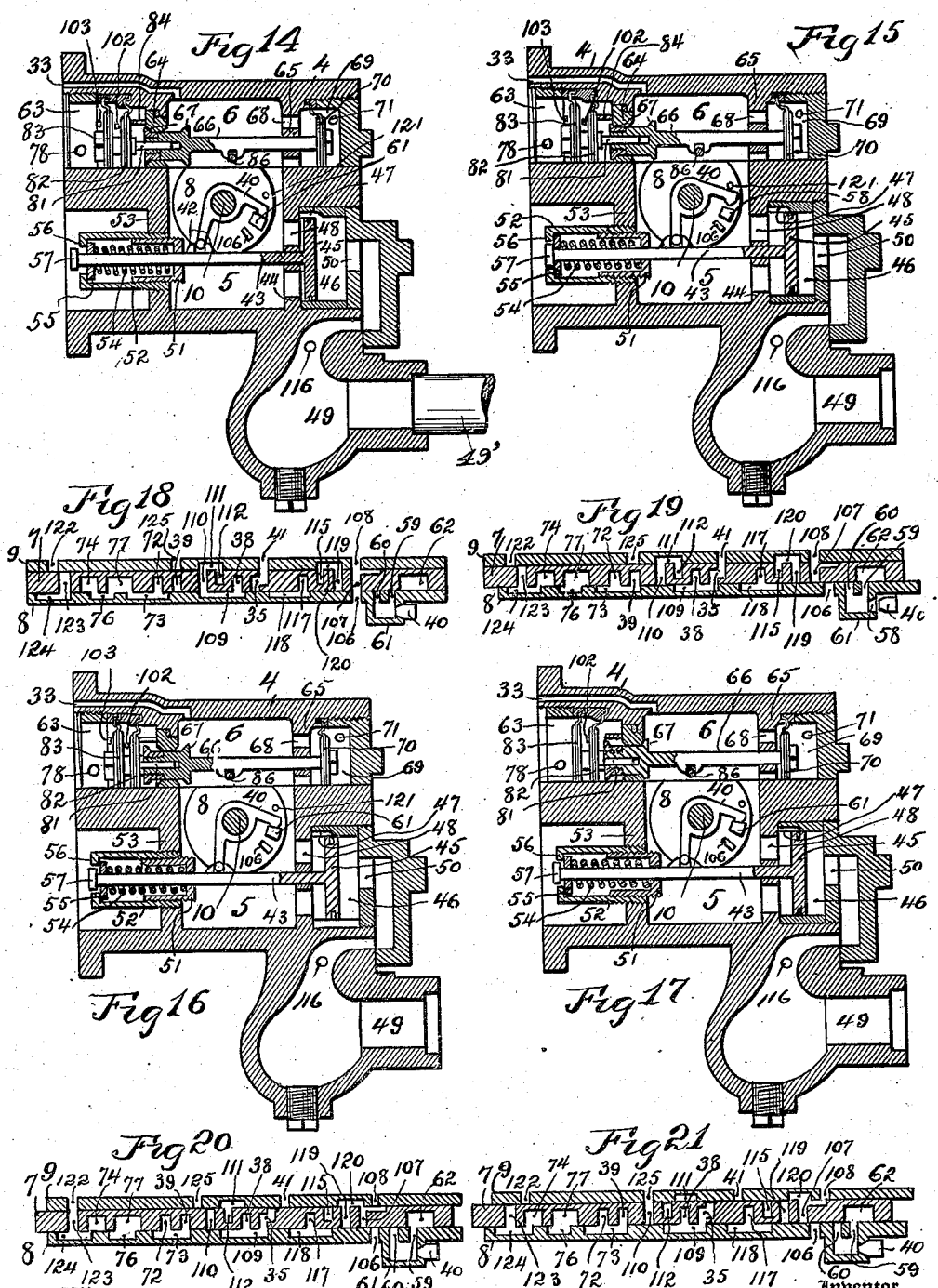

UNITED STATES PATENT OFFICE.

THOMAS H. VAN DYKE, OF KANSAS CITY, MISSOURI, ASSIGNOR OF ONE-THIRD TO JAMES DOARN AND ONE-THIRD TO LEE B. METTLER, OF KANSAS CITY, MISSOURI.

AIR-BRAKE.

No. 854,857.      Specification of Letters Patent.      Patented May 28, 1907.

Application filed July 12, 1906. Serial No. 325,851.

*To all whom it may concern:*

Be it known that I, THOMAS H. VAN DYKE, a citizen of the United States, residing at Kansas City, in the county of Jackson and State of Missouri, have invented certain new and useful Improvements in Air-Brakes, of which the following is a specification.

My invention relates to improvements in air brakes.

The objects of my invention are as follows:— To provide an apparatus by which substantially the same braking power may be applied to the piston irrespective of the distance of piston travel; to provide means by which the slack is taken up with the same force regardless of the amount of power that is being applied to the brakes or as to whether an emergency or a service application is made; to provide a braking mechanism by which a plurality of consecutive braking applications may be made without having to recharge the auxiliary reservoir or braking cylinder; to provide an apparatus in which the amount of increase in train line pressure is not affected by the length of piston travel, whereby the brakes on different cars may be simultaneously released; to provide a brake mechanism by which brakes having a short piston travel are not applied with a force above the normal; to provide a brake mechanism in which, when the brakes are applied and while the train is running with the engineer's brake valve on lap, the force of application of the brakes will not be diminished by leakage; to provide means by which an excess of braking pressure is avoided; to provide a brake in which the amount of air required to be used in making a braking application decreases with the increase in distance of piston travel; to provide a mechanism which, when used for high speed braking an increased braking power may be obtained without increased train line pressure, said increase gradually reducing as the train slows down; to provide a mechanism which may be so adjusted when used on loaded cars that an increase in braking power may be obtained without increasing the train line pressure, said increase in braking power not reducing as the train slows down.

Other novel features of my invention are hereinafter fully described and claimed.

Figure 11:
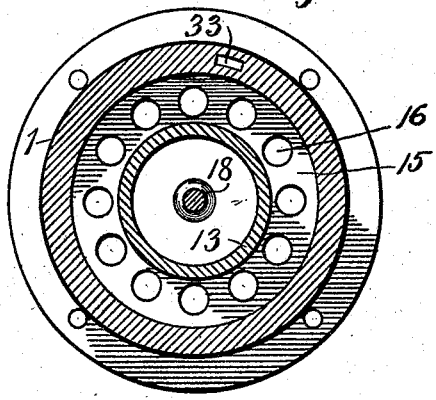
Figure 12:
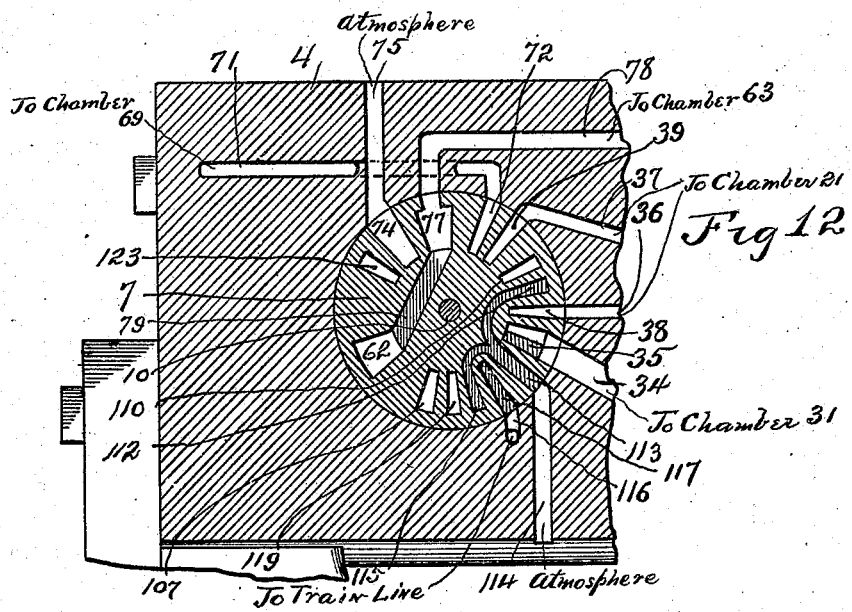
Figure 13:
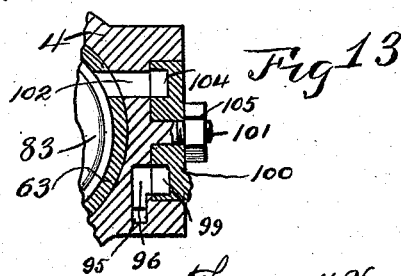

In the accompanying drawing illustrating my invention—Figure 1 is a vertical longitudinal sectional view of the auxiliary reservoir or braking cylinder taken on the broken dotted line indicated by $a$, $b$, $h$, and $c$ of Fig. 4, looking in the direction indicated by the arrow A. In this view the braking pistons are shown in the release or charging positions. Figs. 2 and 3 are respectively opposite end views of the valve seat plate 7. Fig. 4 is a vertical sectional view taken on the dotted line $o$—$p$ of Fig. 5. Fig. 5 is a vertical sectional view taken on the dotted line $a$—$d$ of Fig. 4 looking in the direction denoted by arrow A. Fig. 6 is a side elevation view of the triple valve and a portion of the braking cylinder, the hand valve 100 being removed. Fig. 7 is an elevation view looking at the inner side of the hand valve 100. Figs. 8 and 9 are elevation views of the valves 8 and 9 respectively looking at the inner sides thereof. Fig. 10 is a vertical sectional view taken on the dotted line $m$—$n$ of Fig. 1. Fig. 11 is a vertical sectional view taken on the dotted line $k$—$l$ of Fig. 1. Fig. 12 is a vertical sectional view taken on the dotted line $h$—$c$ of Fig. 4. Fig. 13 is a vertical sectional view taken on the dotted line $i$—$j$ of Fig. 6. Figs. 14, 15, 16 and 17 are vertical sections of the triple valve mechanism each taken on the broken dotted line $a$, $e$, $f$ and $g$ in Fig. 4, looking in the direction denoted by the arrow B. Fig. 14 shows the parts in the initial, charging, or release positions. Fig. 15 shows the same parts in the positions occupied by them when slack is being taken up. Fig. 16 represents the same parts in the positions occupied by them before the full power has been applied to the brakes. Fig. 17 represents the same parts in the lap position, in which position the brakes are set with the amount of power corresponding to the reduction of pressure in the train line. Figs. 18, 19, 20 and 21 are views showing the relative positions of the rotary valves 8 and 9 and valve seat plate 7 when the parts are in the positions corresponding respectively to the positions represented by Figs. 14, 15, 16 and 17.

In order to represent the ports which are circularly arranged in the seat plate 7 and rotary disk valves 8 and 9, in their proper relative positions, the Figs. 18, 19, 20 and 21 represent the valves 8 and 9 and valve seat plate 7 in section taken on the dotted circle $q$ in Fig. 2, said circular section being then transversely divided on the dotted line $r, s$, in said figure and then laid out horizontally, as shown in Figs. 18 to 21 inclusive.

Similar characters of reference denote similar parts.

1 denotes the braking cylinder having heads 2 and 3, the triple valve casing 4 being attached to head 2. The casing 4 is provided with two chambers 5 and 6 separated from each other by a vertical partition having a transverse hole in which is secured a plate 7 having opposite sides ground and providing seats respectively for two disk valves 8 and 9 mounted oscillatively in chambers 5 and 6 on the horizontal bolt 10 extending through the plate 7, the head of the bolt bearing against the outer side of the valve 8, the threaded end of the bolt having mounted thereon nuts 11 against the inner one of which bears one end of a coil spring 12 the other end of which bears against the valve 9, said spring serving to retain the valves seated.

In the cylinder 1 is concentrically mounted a smaller cylinder 13 having at its ends the peripheral flanges 14 and 15 fitted in the cylinder 1, the flange 15 having holes 16 for the passage of air. Reciprocatively mounted in cylinder 1 is a piston having two heads 17 and 19 reciprocatively mounted respectively in the two cylinders 1 and 13, a piston rod 18 connecting the heads 17 and 19, the piston having further a portion projecting through the head 3 which is provided with a central hole in which said projecting portion is reciprocatively mounted, said projecting portion having a diameter smaller than the piston head 19. The head 19 is adapted when in the position shown in Fig. 1 to seat upon an annular resilient seat 20 fitted to the inner rear periphery of the cylinder 13.

I will now describe how the projecting portion of the piston is secured to the piston rod 18. Reciprocatively mounted in the central hole in the head 3 is a sleeve 22 having at its outer end a peripheral flange 23 adapted to bear upon an annular seat 24 encircling said central hole. On the inner side of the head 3 encircling the sleeve 22 is a packing ring 25 which bears upon said sleeve. The sleeve at its outer end is provided with a transverse partition 26 having a central hole in which is slidably mounted the ordinary push rod 27 provided in the ordinary manner at its outer end with means for being connected with the brake lever, not shown. The inner end of the push rod 27 bears upon the solid inner end of the sleeve 22, said solid end being screw threaded and fitted to the outer screw threaded end of a cap 28, the inner end of which is provided with a central hole in which is longitudinally slidable the outer end of rod 18. In the cap 28 is a coil spring 29 which encircles the rod 18 and bears at its outer end upon a peripheral flange 30 at the outer end of the piston rod 18, and at its other end the spring bears upon the inner end of the cap 28. The spring connection so formed between the piston rod 18 and the projecting portion of the piston, that is the sleeve 22, permits the flange 23 and piston head 19 to seat simultaneously on the rings 25 and 20 respectively.

The piston head 17 transversely divides the cylinder 1 into two chambers 31 and 32. Chamber 32 is connected by a passage 33 with chamber 6. A passage 34 extending through casing 4, head 2 and flange 14 connects chamber 31 with a port 35 in seat plate 7. Chamber 21 is connected to the ends of two passages 36 and 37, the opposite ends of which are connected with ports 38 and 39 in seat plate 7.

Oscillatively mounted on the bolt 10 in chamber 5 is a bell crank graduating valve 40, one arm of which is mounted between two shoulders 42 on a horizontal slidable piston rod 43 one end of which extends through a hole provided in the wall 44 inclosing one side of the chamber 5. This end of the rod 43 outside said wall 44 is provided with a piston 45 slidably fitted in a circular chamber 46 the upper side of which adjacent the wall 44 is provided with a longitudinal groove 47 through which the air admitted to chamber 46 may pass the piston 45, when said piston is in the position shown in Fig. 14. In the wall 44 are provided openings 48 through which air enters chamber 5 from chamber 46. 49 denotes a passage in casing 4 which at one end communicates with chamber 46 by an opening 50, the other end being the one to which is secured the train line pipe 49', which supplies the triple valve with air from the engine. The opposite end of the piston rod 43 extends through and is slidably mounted in an externally threaded cap 51 fitted in the internally screw threaded inner end of a horizontal tube 52 the inner end of which is fitted in a threaded hole in the wall 53 of chamber 5.

Encircling the rod 43 in the cap 51 is a coil spring 54 one end of which bears against the cap and the other end bears against a washer 55 mounted on the rod 43 and bearing at its outer side against an annular flange 56 on the inner periphery of the tube 52. On the outer end of the rod 43 is provided a head 57 which when an emergency application of the brake is made bears against the washer 55 hard enough to move the washer inward against the pressure of the spring, an action which under ordinary service can not take place. At such emergency actions, the rod 43 moving inwardly further, as hereinafter explained opens all the ports to a greater extent than ordinary, thus increasing the quickness of application of the brakes. The other arm of the bell crank valve 40 is adapted to enter an opening 58 in a housing 61 covering two ports 59 and 60 in the disk valve 8. The ports 59 and 60 are adapted, when the valve 8 is properly moved to register with the port 62 in plate 7, which port communicates with a passage in casing 4 leading to a chamber in said casing denoted by 63, which chamber is separated from chamber 6 by a vertical wall 64.

Opposite the wall 64 is a wall 65. A horizontal piston rod 66 is slidably mounted in openings provided in walls 64 and 65. The piston rod 66 at opposite sides of the wall 64 is provided with peripheral flanges 67 which limit the movement in both directions of said rod. The wall 65 is provided with openings 68 connecting the chamber 6 with chamber 69. In chamber 69 is a flexible diaphragm piston 70 the periphery of which is secured to the circular walls of chamber 69, said piston 70 being centrally secured to the piston rod 66. The chamber 69 is connected by a passage 71 with a port 72 in plate 7. Port 72, when the brakes are being set is connected with port 39 by recess 73 in valve 8, and said port 72, is connected, during release or charging position with the atmosphere by means of recesses 73 and 76 in valve 8, ports 74 and 77 in plate 7, and passage 75 of casing 4, as shown in Figs. 8 and 12. The port 77 also connects by passage 78 with chamber 63. Ports 77 and 62 are connected with each other by a passage 79 in plate 7. In the left end of piston rod 66, as viewed in Fig. 14, and at the right, as viewed in Fig. 5, is provided a central longitudinal hole 80 in which is slidably mounted a piston rod 81 to the outer, or right end as viewed in Fig. 5, are secured centrally two diaphragm flexible pistons 82 and 83, the peripheries of said pistons being secured to the inner periphery of the wall of chamber 63. The said pistons are disposed between the wall 64 and the passage 78, and the smaller of said pistons 82 is the same in diameter as piston 70. On the wall 64 is a projection 84 for limiting the movement of the pistons 82 and 83. The rod 66 is provided with two shoulders 85 between which is disposed a pin 86 secured to the outer face of the disk valve 9. Longitudinal reciprocation of the rod 66 oscillates said valve 9.

In the lower end of casing 4 is provided a cylindrical hole 87 in which is mounted a piston 88 mounted on one end of a piston rod 89, the other end of which rod is slidably mounted in a horizontal hole in a peripherally screw threaded disk 90 fitted in the threaded outer end of the hole 87, the extreme outer end of said hole being closed by a plug 91. Encircling the rod 89 is a coil spring 92 one end of which bears against the piston 88 and the other end bearing upon the disk 90. In the lower side of the cylindrical hole or chamber 87 is provided a longitudinal groove 93 which permits the air to pass the piston 88. Said chamber 87 is connected by a passage 94 with chamber 31 of the braking cylinder. Said chamber 87 is connected upon the side of the piston opposite to passage 94 to one end of a passage 95, the other end of which is connected with a port 96, shown in Fig. 6. Adjacent the port 96 is a port 97 communicating in the casing 4 with a passage 98 which connects with chamber 6. Ports 96 and 97 may be connected with each other by a recess 99 provided on the inner side of a hand valve 100 oscillatively mounted on a stud 101 secured to the outer side of the casing 4. Upon opposite sides of the stud 101 are two ports 102 and 103 which communicate with chamber 63 at opposite sides of the large piston 83. Ports 102 and 103 may be connected with each other by a recess upon the inner side of the hand valve 100. The recess 99 is large enough so that the hand valve may be turned to a position in which the ports 102 and 103 will be disconnected without disconnecting the ports 96 and 97.

The valve 100 is held upon the stud 101 by means of a nut 105. By operating the hand lever 100 as hereinafter described the mechanism may be adapted alternately for use on a loaded or empty car. Furthermore by properly adjusting the said valve the apparatus may be used for high speed service.

Referring to Figs. 5, 8, 9, 12 and 14, 061 denotes a port extending through the valve 8 and which registers with port 107 in the plate 7, which in turn registers with the port 108 extending through the valve 9 when the valves are in the release or charging positions shown in Figs. 5 and 14. It will thus be seen that when the valves are as shown in Figs. 5 and 14 the air may pass from the train line into passage 49, thence through passage 50 into chamber 46, thence past piston 45 by way of groove 47, thence into chamber 5 through the openings 48, thence through port 106, in valve 8, port 107 in plate 7, port 108 in valve 9 into chamber 6 from which the air passes by way of port 41 in valve 9 into port 35 in plate 7, thence by passage 34 into chamber 31, thus charging at train pressure the chamber 31 lying to the left of piston head 17 as viewed in Fig. 1. Air from chamber 6 passes through passage 33 into the forward end of cylinder to the right of piston head 17, as viewed in Fig. 1, which part of the cylinder is termed chamber 32. It will thus be seen that with air at train pressure in chambers 31 and 32, and chamber 21 being, as hereinafter described, connected with the atmosphere the larger area of piston head 19 over the area of cross section of sleeve 22, will cause the piston head 17 together with piston rod 18 and piston head 19 to move to the position shown in Fig. 1, which is the release position, the piston head 19 being seated against ring 20 and the flange 23 being seated against ring 24. Chamber 21 at this time is connected with the atmosphere as follows:—The passage 36 connecting with chamber 21 also connects with port 38 in plate 7, which port at this position of the valves connects with recess 109, see Fig. 8, on the inner or ground side of valve 8, said recess 109 also registers at this time with port 110 which extends through the seat plate 7 and registers with recess 111, on the inner side of valve 9, see Fig. 9, which latter recess also registers, when the valve 9 is in this position, with the arm 112 of a bifurcated port or passage 113 in the seat plate 7. The passage 113 connects with a passage 114 in casing 4 leading to the atmosphere.

During an emergency application, the train line discharges to the atmosphere as follows: The valves 8 and 9 having been forced to a suitable position as hereinafter related, the train line will discharge through passage 49 into passage 116 which connects with a port 117 in seat plate 7. This port 117 connects, when the valves 8 and 9 are in the emergency position with a recess 118 on the inner side of valve 8. Recess 118 at this time registers with a port 119 extending clear through seat plate 7 and registering in the emergency position with the recess 120 in the inner side of valve 9, said recess 120 at the same time registering with the other arm 115 of the bifurcated passage 113. The object of having the train line discharge, during an emergency application through the passages 116 and 117 as described is to allow a more ready discharge of the air from the train line than could be accomplished by having all the air in train line escape through the engineer's valve, as is ordinarily done.

When it is desired to make a service application of the brakes, the engineer withdraws the desired amount of air from the train line, thus reducing the pressure in chamber 46 below what it is in chamber 5. The excess of pressure in chamber 5 acting on piston 45 will force the piston rod 43 to the position shown in Fig. 15, in which position the piston 45 will pass the end of groove 47 and prevent air passing from chamber 5 to chamber 46. The rod 43 will move until the head 57 strikes the washer 55 when the spring 54 will hold the rod from further movement. The rod 43 in moving to the position shown in Fig. 15 swings the graduating valve 40 against a pin 121 on the outer face of valve 8 and rotates said valve to a position in which the port 106 will be cut off from port 107 in plate 7, thus cutting chamber 5 off from chamber 6. The valve 8 being rotated to the position shown in Fig. 15 as just described, will be in a position in which port 59 under housing 61 will register, as shown in Fig. 19, with port 62 of plate 7. At the same time that the valve 40 swings it will open passage 58 in the housing, as shown in Fig. 19, and the air will then pass from chamber 5, through passage 58, into housing 61, thence through port 59, when service application is made, otherwise during emergency application also through port 60, into port 62, thence by passage 79 to port 77, thence by passage 78 into chamber 63. If the hand valve 100 is set for an empty car ports 102 and 103 will be connected by recess 104, and air in chamber 63 will accumulate at both ends of piston 83 at a pressure substantially two and a half times the amount of pressure withdrawn from the train line, the relative sizes of chambers 5 and 63 permitting this. Sufficient air having escaped from chamber 5 to chamber 63 so that air pressure in chamber 5 is slightly less than in chamber 46 at right of piston 45, the pressure in chamber 46 will force the piston 45 to position shown in Fig. 16, in which position valve 40 will close opening 58 and shut off chamber 63, but not retracting valve 8. Valve 8 during its first movement will have shut off chamber 21 from the atmosphere by disconnecting from each other ports 109 and 110, as shown in Fig. 19. At the same time port 38 will connect with port 35 by recess 109, thus permitting air from chamber 31 to go by passages 34 and 36, see Figs. 1 and 12, into chamber 21. At the same time ports 39 and 72 will be connected by recess 73 in valve 8 and air will pass from chamber 21 by passage 37, ports 39 and 72, and recess 73, into passage 71, and thence into chamber 69. Chambers 21, 31 and 32 and also chamber 6, being thus connected, the pressure at both sides of each piston head 17 and 19 will equalize, sleeve 22 however, having an outward pressure upon it corresponding to the pressure in chamber 32 upon the area of the cross section of said sleeve. It will thus be seen that the outward pressure on sleeve 22 in chamber 32 will force the piston heads 17 and 19 outward to a position in which the slack will be taken up and the shoes brought against the wheels. In the meantime chamber 69 will attain the same pressure as in chamber 6, that is the portion of chamber 69 on the side of piston 70 next the passage 71. The pressure on that side of piston 70 will be greater by the difference in relative cross section between the large part of the piston rod 66 and piston 70, and the piston rod 66 will be forced to the position shown in Fig. 16 at which time the piston rod 66 will strike the piston 82 and will be held from further movement until air has been withdrawn from chamber 6. This is accomplished as follows:—The piston rod 66 in moving rotates for the first time valve 9, by means of shoulders 85 and pin 86 and positions valve 9 so that ports 41 and 35 are disconnected, thus cutting off chamber 31 from chamber 32, and at the same time chamber 6 is connected with the atmosphere, so that chamber 32 will discharge a part of its air through passage 33 into chamber 6. To accomplish the discharging of air from the chamber 6, at the time valve 9 is moved, as described, a port 122 extending through valve 9 is brought into register with a port 123 extending through seat plate 7, as shown in Fig. 20. At this time port 123 in plate 7 is in register with a recess 124 on the inner side of valve 8 and recess 124 is at this time in register also with port 74, thus permitting the air to escape to atmosphere through passage 75, see Fig. 12.

An amount of air will escape from chamber 6 that will exceed slightly the amount of air that was let into chamber 63, for it is the air in this chamber that held the piston rod 66 in the position shown in Fig. 16. When the piston rod 66 is forced to continue its forward movement by the greater pressure on the right side of piston 70, as viewed in Fig. 16, it will move to the poition shown in Fig. 17 in which position the flange 67 will seat against the wall 64. While the piston rod 66 is moving this last described movement it will rotate the valve 9 still further so as to cut off port 122 from port 123, see Fig. 21.

When the air is withdrawn from chamber 32 by way of chamber 6 as just described, the triple valve parts will be in the lap position, shown by Fig. 17 and Fig. 21. The piston heads 17 and 19 will now be forced forward by whatever amount of pressure has been removed from chamber 32. It will be noted that with this brake only the air is lost that is taken after the piston has moved to a position in which the slack is taken up, and that regardless of piston travel, substantially the same pressure is exerted upon the brake shoes. And as the brake is applied with the amount of air withdrawn from chamber 32 the nearer the outer end of the cylinder the piston moves in taking up the slack the less air is required to be taken from the chamber to set the brakes.

In the event that there is leakage of air past piston head 17 from chamber 31 to chamber 32, the pressure in chamber 6 will cause the piston rod 66 to be moved so as to again connect ports 122 and 123 thereby letting air escape from chamber 6 corresponding to the amount of leakage past piston head 17. There is therefore the same pressure upon the piston to be used for applying the brakes as though no leakage took place.

To release the brakes after setting, the train line pressure is increased, thus forcing the piston 45 to the position shown in Fig. 14 thereby admitting air into chamber 5 and at the same time turning valve 8 back to the position shown in Fig. 14, which action sets the ports so that port 109 again registers with port 110, and port 110 being already in register with a port 125 extending through valve 9, the air passes from chamber 21 into chamber 6 and also through passage 33 into chamber 32. The increase in pressure in chamber 6 over that in chamber 69 causes the piston 70 and piston rod 66 to return to the position shown in Fig. 14, thus retracting the valve 9 and disconnecting chamber 21 and chamber 6, but connecting chamber 21 with the atmosphere as in the initial position first described, and at the same time bringing ports 106, 107 and 108 into register so that the air will pass therethrough and entering chambers 6 and 32, and simultaneously with this chambers 31 and 32 are reconnected, the ports all having been reset to the positions shown in Fig. 18, which is the release or charging position, corresponding to the positions shown in Fig. 14. When the air has become equalized in chambers 5, 6, 31 and 32, excess of pressure on the outer ends of piston heads 17 and 19 retracts the piston to the positions shown in Fig. 1, in which position all the parts are ready for another braking application.

If for any reason it is desired to make a second application of the brakes without taking time for recharging, this may be done with my brake for the reason that, after the first application, there is a reserve amount of air in storage in chamber 31 and 32 sufficient to make a second application of the brakes. Illustrative of this it may be stated that if a full application of the brakes has been made at say fifty pounds pressure on the brake piston, and the original charge in the chambers 31 and 32 is approximately 70 pounds, the amount of pressure required in my brake for an average piston travel would reduce the stored pressure to approximately fifty-nine pounds, thus giving a reserve sufficient to make another full 50 pound braking pressure. The above has reference to the use of the brake with an empty car. If a loaded car is used, the pressure in chamber 32 should be reduced more than in the case with an empty. To do this the hand valve 100 is turned so that port 102 is cut off from recess 104, thus cutting out that part of chamber 63 to the right of piston 83, as viewed in Fig. 14. The piston 83 being of greater diameter than piston 70, a greater amount of air must be withdrawn from chamber 6 and therefore chamber 32 before piston 70 can force piston rod 66 from the position shown in Fig. 16 to that shown in Fig. 17 where the chamber 6 is shut off from the atmosphere. When the hand valve is set so that the ports 102 and 103 are connected, the ports 96 and 97 are connected by the recess 99 in valve 100, thereby cutting in the reducing valve 88 in chamber 87 and preventing the application at too great a pressure of the brakes of an empty car. This is accomplished as follows:

When the hand valve 100 is positioned so that ports 96 and 97 are connected, if the pressure in chamber 31 becomes too great the spring 92 will yield and the valve or piston 88 will move from its seat, thus permitting air from chamber 31 to pass through passage 94 and passage 93 into chamber 87 past the valve 88. The air will then pass by passage 95, ports 96 and 97, recess 99 and passage 98 into chamber 6, and by passage 33 to chamber 32. Spring 92 is adjusted so that valve 88 will when first opened by air pressure be disposed over the passage 93 adjacent but not covering its reduced end, said passage gradually increasing in depth toward the seat of said valve. As the pressure weakens in chamber 31 the piston will move toward the seat and a larger space will thus be provided in the passage 93 for the passage of air until finally the valve 88 will seat itself. Thus at the first application of the brake, with the valve 100 set so as to cut in the reducing valve 88, a greater pressure will be applied to the brakes, which pressure will gradually reduce as the train slows down. The disposition and size of the ports 102 and 103 and 96 and 97 and recesses 99 and 104 are such that when used for an empty car the hand valve 100 is set so that ports 102 and 103, and ports 96 and 97 are connected respectively. When used for high speed, valve 100 is shifted to a position such that ports 102 and 103 will be cut off from connection with each other, but ports 96 and 97 will be connected with each other so as to cut in the reducing valve 88. For use on a loaded car, the valve 100 is shifted so as to disconnect ports 102 and 103 and also ports 96 and 97.

When an emergency application is made, the pressure in chamber 5 first moves the piston 45 and rod 43 to the position shown in Fig. 15, as hereinbefore described, but owing to the large amount of air being taken from the train line, in the emergency application, the excess pressure in chamber 5 will force piston 45 and rod 43 further to the right than in a service application, and will therefore shift the valve 8 from the position shown in Fig. 19 to one in which ports 117 and 119 will be connected by recess 118, and, as already described, connecting the train line by means of passages 49, 116 and 114 with the atmosphere, thus relieving the train line of pressure at the triple valve. As hereinbefore related, the service application will also move valve 8 so that port 60 will register with port 62 thus permitting more air to pass into chamber 63.

From the preceding description it will be noted that when the engineer makes a service application that train line pressure will be in the two chambers 31 and 32 of the braking cylinder 1 which is also the auxiliary reservoir, and when the application is made by a reduction in pressure in the train line, valve 8 will be shifted so as to disconnect chambers 5 and 6 with each other and at the same time disconnecting chamber 21 from the atmosphere and connecting it with chambers 69 and 31. When chambers 31 and 21 shall equalize in pressure, which will be after the pressure in 32, by acting on sleeve 22, has forced the piston heads 17 and 19 together with sleeve 22 and push rod 27, to positions in which the slack will be taken up and the brakes applied to the wheels, the pressure in chamber 69 will force the piston 70 and piston rod 66 to the position shown in Fig. 16, thus shifting the valve 9 to a position in which chamber 6 and therefore chamber 32 by means of passage 33, will be connected with the atmosphere and disconnected from chambers 31 and 21. When an amount of air in pressure slightly below that that was first admitted into chamber 63 has escaped from chambers 6 and 32, the pressure in chamber 69 will force the piston rod 66, together with the valve 9 to the positions shown in Figs. 17 and 21, in which positions the valves 8 and 9 will be in lap and the brakes will be held by the full braking pressure against the wheels. If now, the requisite pressure is applied to the train line the valve 8 in the triple valve will be shifted again to the initial position shown in Fig. 14, thus connecting chambers 5 and 6 and chambers 21 and 32. The increase in pressure in chamber 6 will then shift valve 9, after piston heads 17 and 19 have been retracted to the position shown in Fig. 1 and again connecting chamber 21 with the atmosphere. The parts at this time will all be in the position shown in Fig. 14 and another braking application may be made when desired.

Having thus described my invention, what I claim and desire to secure by Letters Patent, is:—

1. The combination with the braking cylinder, of the piston reciprocatively mounted in the said cylinder, means connected with the piston and adapted to be connected with the brake shoes for forcing the brake shoes against the wheels when the piston is moved to the braking position, the train line, and means controlled by the reduction of pressure in the train line by which air stored in the braking cylinder is applied to the piston during the piston travel at a uniform pressure irrespective of the amount of reduction in the train line pressure for moving the piston from the release to the braking position without the discharge of air from the cylinder to the atmosphere.

2. The combination with the braking cylinder, of the piston reciprocatively mounted in said cylinder, means connected with the piston and adapted to be connected with the brake shoes for forcing the brake shoes against the wheels when the piston is moved to the braking position, the train line, means controlled by the reduction of pressure in the train line by which air is applied to the piston during piston travel at a uniform pressure irrespective of the amount of reduction in the train line pressure for moving the piston from the release to the braking position, and means by which when the piston has reached the braking position in the cylinder effective braking pressure is applied to the piston proportionate to the amount of reduction of pressure in the train line and in a direction for forcing the brake shoes against the wheels.

3. The combination with the braking cylinder, of the piston reciprocatively mounted in the cylinder, means by which air at train line pressure may be introduced into the cylinder at both ends of the piston, means by which a greater area at the forward end than at the rear end of the piston may be subjected to the air pressure, thereby forcing the piston to the rear or release position, and means by which the air pressure may be applied to a greater area at the rear than at the forward end of the piston, whereby the piston will be forced from the release to the braking position.

4. The combination with the braking cylinder, of the piston reciprocatively mounted in the cylinder, means by which air at train line pressure may be introduced into the cylinder at both ends of the piston, means by which a greater area at the forward end of the piston than at the rear end thereof may be subjected to the air pressure, thereby forcing the piston to the rear or release position, means by which the air pressure may be applied to a greater area at the rear end of than at the forward end of the piston, whereby the piston will be forced forward from the release to the braking position, and means by which when the piston has reached the braking position air will be discharged to the atmosphere from the cylinder forward of the forward end of the piston.

5. The combination with the braking cylinder, of the piston reciprocatively mounted in the cylinder, means by which air at train line pressure may be introduced into the cylinder at both ends of the piston, means by which a greater area at the forward than at the rear end of the piston may be subjected to the air pressure, whereby the piston is forced from the forward or braking to the release position, means actuated by reduction in the train line pressure by which a greater area at the rear than at the forward end of the piston may be subjected to the air pressure, whereby the piston may be forced from the release to the braking position, and means by which when the piston has reached the braking position air proportionate to the amount of reduction in the train line pressure will be discharged to the atmosphere from the cylinder forward of the forward end of the piston.

6. The combination with the braking cylinder, of the piston reciprocatively mounted in the cylinder, means by which air at train line pressure may be introduced into the cylinder at both ends of the piston, means by which a greater area at the forward than at the rear end of the piston may be subjected to the said air pressure, whereby the piston will be forced from the braking position to the rear or release position, means actuated by reduction in the train line pressure by which a greater area at the rear than at the forward end of the piston may be subjected to said air pressure, whereby the piston will be forced forward to the braking position from the release position, means by which when the piston has reached the braking position air will be discharged to the atmosphere from the cylinder forward of the piston and proportionate to the reduction in train line pressure, and regulatable means for controlling the proportion of the air so discharged relative to the train line reduction.

7. The combination with the braking piston, of the train line, means for applying air at the same degree of pressure from the train line to opposite ends of the piston and alternately over different areas at said ends, the pressure in the train line controlling at which end the greater area is subjected to the said air pressure.

8. The combination with the braking piston, of the train line, means for applying air at the same degree of pressure from the train line at the forward and rear ends of the piston and alternately over different areas at the ends, whereby the piston is moved to and from the braking position, the pressure in the train line determining at which end the greater area is subjected to the air pressure, said means providing when the piston has reached the braking position a reduction in pressure at the forward end of the piston proportionate to the reduction made in pressure in the train line.

9. The combination with the braking piston, of the train line, means for applying air from train line at same degree of pressure at the forward and rear ends of piston and alternately over different areas at the ends, thereby the piston is moved to and from the braking position, the pressure in the train line determining at which end the greater area is subjected to the air pressure, said means providing, when the piston has reached the braking position, a reduction in pressure proportionate to the reduction in pressure in the train line, and adjustable means for varying the proportion of reduction in pressure at the forward end of the piston relative to the reduction in pressure in the train line.

10. The combination with the braking piston, of the train line, means for applying air at the same degree of pressure at the forward and rear ends of the piston from the train line and alternately over different areas at the ends, whereby the piston is moved to and from the braking position, the pressure in the train line determining at which end the greater area is subjected to the air pressure, said means providing when the piston has reached the braking position a reduction in pressure will be made at the forward end of the piston proportionate to the reduction of pressure made in the train line, and means by which the excess of pressure at the rear end over that at the forward end of the piston may be automatically limited to a predetermined amount.

11. The combination with the braking piston, of the train line, means for applying air from the train line at the same degree of pressure at the forward and rear ends of the piston and alternately over different areas at the ends, whereby the piston is moved to and from the braking position, the pressure in the train line determining at which end the greater area is subjected to the air pressure, said means providing, when the piston has reached the braking position, a reduction in pressure at the forward end of the piston proportion to the reduction of pressure in the train line, and adjustable means by which the excess of pressure at the rear end over that at the forward end of the piston may be automatically limited.

12. The combination with the braking piston, of the train line, means for applying air from the train line at the same degree of pressure at the forward and rear ends of the piston and alternately over different areas at the ends, whereby the piston is moved to and from the braking position, the pressure in the train line determining at which end the greater area is subjected to pressure, said means providing that when the piston has reached the braking position a reduction in pressure will be made at the forward end of the piston proportionate with the reduction of pressure in the train line, adjustable means for varying the proportion of reduction in pressure at the forward end of the piston relative to the reduction in pressure in the train line, and automatic means for limiting the excess of pressure at the rear over that at the forward end of the piston.

13. The combination with the braking piston, of the train line, and mechanism intermediate the train line and piston by which air at the same degree of pressure may be applied from the train line at the forward and rear end of the piston and alternately over different areas at said ends, said mechanism having means by which when a sufficient pressure is made in the train line the greater area under pressure will be at the forward end of the piston and when a reduction of pressure is made in the train line air will be transferred from the forward end of the piston to a greater area at the rear end of the piston, thus moving the piston to the braking position, said mechanism providing that when the piston has reached the braking position, air at the forward end of the piston will be released to the atmosphere reducing the pressure at the forward end of the piston proportionate to the reduction of pressure in the train line.

14. The combination with the braking piston, of the train line, and mechanism by which when sufficient pressure is made in the train line air therefrom will be applied at both ends of the piston the greater area of pressure being at the forward end of the piston, said mechanism providing that when a reduction of pressure is made in the train line air will be transferred from the forward to the rear end of the piston and against a greater area at the rear than at the forward end, thus moving the piston to the braking position, said mechanism providing also that when the piston has reached the braking position air proportionate in pressure to the reduction of pressure in the train line will be discharged from the forward end of the piston to the atmosphere, means also being provided by said mechanism by which when sufficient pressure has again been placed in the train line air from the train line will be applied at both ends of the piston but over a greater area at the forward end thereof, thus moving the piston from the braking to the release position.

15. The combination with the braking piston, of the train line, and means by which air is applied at the forward and rear ends of the piston, said means providing that when a reduction of pressure is made in the train line air at a substantially uniform pressure will be applied over a greater area at the rear than at the forward end of the piston during the piston travel to the braking position.

16. The combination with the braking piston, of the train line, and means by which air is applied at the forward and rear ends of the piston, said means providing that when a reduction of pressure is made in the train line, air at a substantially uniform pressure will be applied over a greater area at the rear than at the forward end of the piston during the piston travel to the braking position, said means providing that when the piston has reached the braking position pressure of air proportionate to the reduction in pressure in the train line will be removed from the forward end of the piston.

17. The combination with the braking piston, of the train line, and means by which air is applied at the forward and rear ends of the piston, said means providing that when a reduction of pressure is made in the train line, air at a substantially uniform pressure will be applied to the rear end of the piston and over a greater area than at the forward end and during the whole of the piston travel, said means providing that when the piston has reached the braking position air proportionate to the reduction in pressure in the train line will be removed from the forward end of the piston, said means providing also that when pressure has been sufficiently increased in the train line a greater area at the forward than at the rear end of the piston will be subjected to the air pressure, thus retracting the piston from the braking position.

18. In air brakes, the combination with two cylinders of different diameters, the smaller cylinder communicating at its forward end with the larger cylinder, both ends of the larger cylinder and the rear end of the smaller cylinder being closed, the larger cylinder having air passages communicating respectively with its forward and rear ends, and the smaller cylinder having means for conveying air to and from its rear end, of the braking piston having two heads reciprocatively mounted in the larger and smaller cylinders respectively, the larger head being intermediate the air passages of the larger cylinder and the smaller head being forward of the air conveying means of the smaller cylinder, the piston having a portion forward of the larger head projecting through the forward end of the larger piston, said projecting portion having a diameter smaller than the diameter of the smaller head, means connecting with said projecting portion of the piston for applying the brakes, valve mechanism connecting with said air passages and with the air conveying means leading to the smaller cylinder, and means controlled by and adapted to be connected with the train pipe by which said valve mechanism is actuated to control the passage of air through said passages and air conveying means.

19. In air brakes, the combination with the piston having two heads of different diameters, of two cylinders in which said heads are reciprocatively fitted, the smaller cylinder communicating with the larger cylinder at the forward end of the smaller cylinder, the larger cylinder being closed at both ends and the smaller cylinder closed at its rear end, the piston at the end forward of the larger head having a portion of smaller diameter than the smaller head and projecting through the forward end of the larger cylinder, the larger cylinder having air passages leading to it forward and rearward of the larger head of the piston, the smaller cylinder having air passages leading to it at the rear of the smaller piston head.

20. In air brakes, the combination with two cylinders, one located within the other, the smaller cylinder at its forward end communicating with the larger one, and the larger cylinder being closed at both ends, the rear end of the larger cylinder having air passages extending therethrough at the inside and outside of the smaller cylinder, the larger cylinder having an air passage communicating with it adjacent its forward end, of a piston having two heads reciprocatively mounted in said two cylinders, the piston forward of the larger head having a portion smaller in diameter than the smaller head and projecting through the forward end of the larger cylinder.

21. In air brakes, the combination with two cylinders of different diameters the smaller communicating with the larger at the forward end of the smaller cylinder, the larger cylinder being closed at both ends and the smaller cylinder closed at its rear end, the smaller cylinder having an annular peripheral seat at its rear end, and the larger cylinder at its closed end having a central hole and on its outer side encircling said hole an annular seat, of the piston having two heads fitted reciprocatively respectively in said cylinders, the piston forward of the larger head having a projecting portion extending through said hole and having an annular flange adapted to rest against the seat encircling said hole when the piston is retracted, the smaller head of the piston being adapted to bear upon the annular seat in the smaller cylinder when the piston is retracted, the larger cylinder having air passages communicating with it forward and rearward of the larger piston head, the smaller cylinder having air passages communicating with it to the rear of the smaller piston head and within the annular seat in the smaller cylinder.

22. In air brakes, the combination with the braking piston, of means by which the piston is moved to and from the braking position by air pressure derived from the train pipe and applied at opposite ends of the piston, and automatic means for limiting the preponderance of pressure at one end over the pressure at the other end of the piston.

23. In air brakes, the combination with the braking piston, of means by which air derived from the train pipe may be applied at opposite ends of the piston simultaneously, means controlled by train pipe pressure by which alternately a greater area at one end of the piston may be subjected to the air pressure than is applied at the opposite end, thereby forcing the piston to and from the braking position, and automatic means for limiting the preponderance of pressure at one end over the pressure at the other end.

24. In air brakes, the combination with the braking piston, of means by which air derived from the train pipe may simultaneously be applied to opposite ends of the piston, means controlled by pressure in the train pipe by which alternately one end of the piston may be subjected to greater pressure than the other end, and automatic means by which the preponderance of pressure at one end over that at the other end of the piston is limited.

25. In air brakes, the combination with the braking piston, of means by which air derived from the train pipe may simultaneously be applied to opposite ends of the piston, means controlled by pressure in the train pipe by which opposite ends are alternately subjected to a preponderance of pressure one end over the other, and regulatable means by which is automatically limited the preponderance of pressure at one end of the piston over that at the other end.

26. In air brakes, the combination with the braking piston, of means by which air derived from the train pipe may simultaneously be applied to opposite ends of the piston, means controlled by pressure in the train pipe by which opposite ends of the piston may each alternately be subjected to pressure over a greater area than the area of the opposite end subjected to pressure, and regulatable automatic means for limiting the preponderance of pressure at one end over that at the other end.

27. In air brakes, the combination with the braking piston, of means by which air derived from the train pipe may be simultaneously applied to opposite ends of the piston, means by which when the train pipe pressure is reduced a greater pressure will be applied at one end than at the other end of the piston, thereby forcing the piston to the braking position, means by which when the piston has reached the braking position air will be discharged from said other end of the piston and automatic means by which the difference in pressure at opposite ends may be limited.

28. In air brakes, the combination with the braking piston, of means by which air derived from the train pipe may be simultaneously applied to opposite ends of the piston, means by which when the train pipe pressure is reduced air pressure will be transferred from one end of the piston to the other end thereof, thereby forcing the piston to the braking position, and means by which, when the piston has reached the braking position, air pressure proportionate to the reduction of pressure in the train pipe may be reduced at the end of the piston from which the air pressure was transferred.

29. In air brakes, the combination with the braking piston, of means by which air derived from the train pipe may be simultaneously applied to opposite ends of the piston, means controlled by train pipe pressure by which opposite ends of the piston are subjected alternately to a preponderance of pressure at one end over that at the other end whereby the piston may be moved to and from the braking position, and means by which, when the piston has reached the braking position, air pressure proportionate to the reduction of pressure in the train pipe will be withdrawn from the end of the piston having at the time the least pressure against it.

30. In air brakes, the combination with the braking piston, of means by which air derived from the train pipe may be simultaneously applied to opposite ends of the piston, means controlled by train pipe pressure by which opposite ends of the piston may each alternately be subjected to air pressure over an area greater than that subjected to pressure at the opposite end, whereby the piston is moved to and from the braking position, and means by which, when the piston has reached the braking position, air pressure proportionate to the reduction of pressure in the train pipe will be withdrawn from the end of the piston which at the time has the smallest area subjected to pressure.

31. In air brakes, the combination with the braking piston, of means by which air derived from the train pipe may be applied to opposite ends of the piston, means controlled by pressure in the train pipe by which opposite ends of the piston may be subjected each alternately to air pressure over a greater area than the area of the opposite end subjected to the air pressure, whereby the piston is moved to and from the braking position, means by which when the piston has reached the braking position air pressure proportionate to the reduction of pressure in the train pipe will be withdrawn from the end of the piston which at the time has the smallest area exposed to the air pressure, and regulatable means for varying the proportion withdrawn relative to the reduction in the train pipe.

32. In air brakes, a triple valve comprising a casing having two chambers one provided with means for being connected with the train pipe and the other provided with means for being connected with the braking cylinder, a passage connecting the chambers with each other, means controlled by the train pipe pressure controlling the admission of air to the chamber having the means for connecting it with the train pipe, a valve actuated by said controlling means and controlling the passage connecting the two chambers, a second valve controlling the passage of air between the braking cylinder and the chamber connected with the braking cylinder, and means actuated by the first named valve for controlling the action of the second named valve.

33. In air brakes, a triple valve comprising a casing having two chambers and passages leading from one chamber to the atmosphere and to the braking cylinder, a passage leading from the other chamber to the train pipe, means controlled by the train pipe pressure controlling the admission of air from the train pipe to the chamber connected with it, a passage connecting the two chambers, a valve controlling said passage and actuated by the means controlling the admission of air from the train pipe with the chamber connected with it, a second valve controlling the passages leading from the chamber connected with the braking cylinder, and means actuated by air pressure and controlled by the first named valve for actuating the second named valve.

34. In air brakes, the triple valve comprising a casing having chambers 5 and 6, means for connecting said chambers respectively with the train pipe and with the braking cylinder, a passage connecting the two chambers, a valve controlling said passage, means controlled by train pipe pressure for actuating said valve, a second valve controlling the means connecting the braking cylinder with the chamber 6, chambers 63 and 69, pistons 82 and 83 mounted in chamber 63, piston 70 mounted in chamber 69, passages connecting chamber 69 with chambers 5 and 6 respectively at opposite sides of piston 70, said passages being controlled by the first named valve, and means controlled by said pistons for actuating the second named valve.

In testimony whereof I affix my signature in presence of two witnesses.

THOMAS H. VAN DYKE.

Witnesses:
   R. E. HAMILTON,
   E. B. HOUSE.